United States Patent [19]
Margaroli et al.

[11] 3,731,615
[45] May 8, 1973

[54] CHERRY PITTER

[75] Inventors: John L. Margaroli, Oakland; Fred J. Cimperman, San Lorenzo, both of Calif.

[73] Assignee: Vistan Corporation, San Leandro, Calif.

[22] Filed: Oct. 5, 1970

[21] Appl. No.: 77,961

[52] U.S. Cl. ...................................99/559, 99/565
[51] Int. Cl. ...............................................A23n 3/00
[58] Field of Search........................146/17, 17 A, 18, 146/19, 27, 224, 238; 198/33 AA

[56] References Cited

UNITED STATES PATENTS

| | | | |
|---|---|---|---|
| 2,293,121 | 8/1942 | Dudley, Jr. | 146/17 A |
| 3,212,545 | 10/1965 | Aquilar | 146/19 X |
| 3,580,381 | 5/1971 | Kilner | 198/33 AA |
| 1,711,051 | 4/1929 | Gates | 198/33 AA |
| 2,558,205 | 6/1951 | Ashlock, Jr. | 146/19 |

*Primary Examiner*—Willie G. Abercrombie
*Attorney*—Naylor & Neal

[57] ABSTRACT

Apparatus and method for removing pits from fruit such as cherries or the like wherein a moveable conveyor is adapted to convey the fruit to pitting knife means. The conveyor has a plurality of open-topped fruit pockets formed therein, each of said fruit pockets being adapted to have disposed therein individual specimens of said fruit. Normally closed slits are provided in the bottoms of said pockets for retaining water therein so that said fruit may orient itself under the influence of gravity while floating. A plurality of slots are formed in the conveyor with at least one of the slots in communication with the interior of each of the fruit pockets. Stem positioning means is disposed adjacent to the path of movement of the conveyor for engaging the stems of the fruit disposed in the fruit pockets as the fruit is being conveyed to the pitting knife means. The stem positioning means positions each fruit stem in a slot which is in communication with the interior of the pocket within which the fruit specimen is disposed. During the actual pitting of the fruit the knife means passes through the fruit forcing the pits thereof through the slits.

13 Claims, 8 Drawing Figures

PATENTED MAY 8 1973 3,731,615

INVENTORS
JOHN L. MARGAROLI
BY FRED J. CIMPERMAN
Naylor & Neal
ATTORNEYS

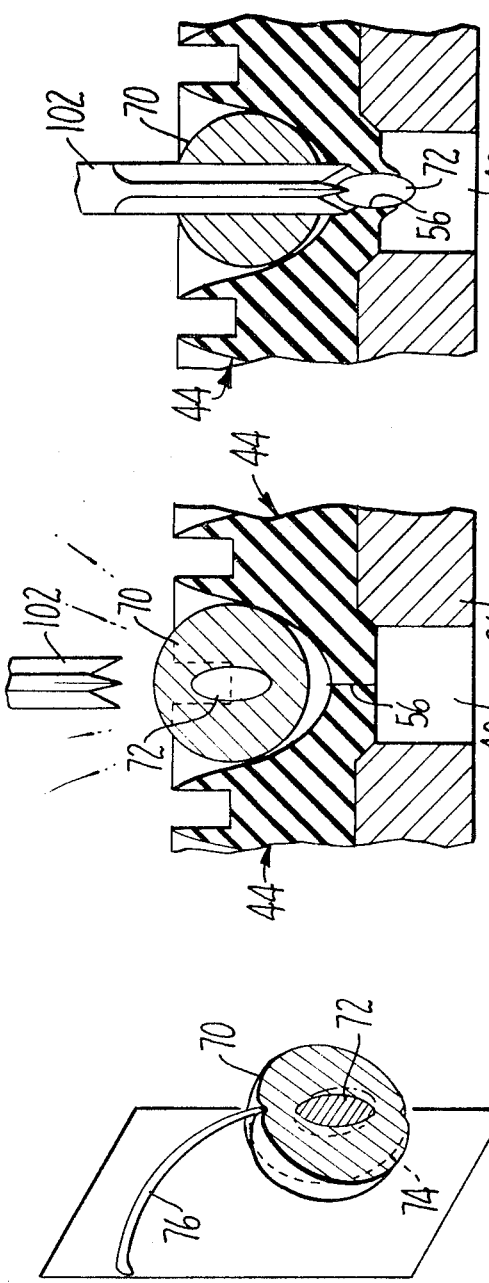

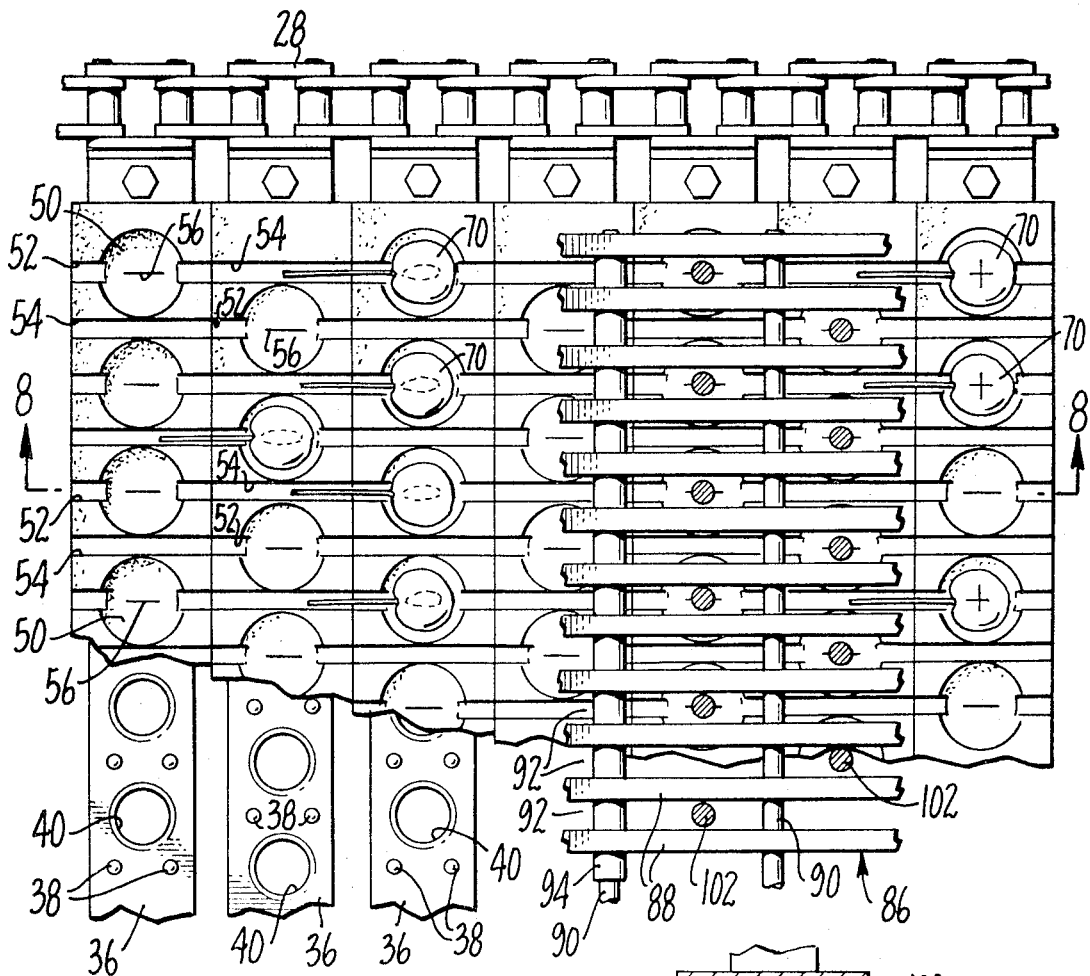
FIG. 7.
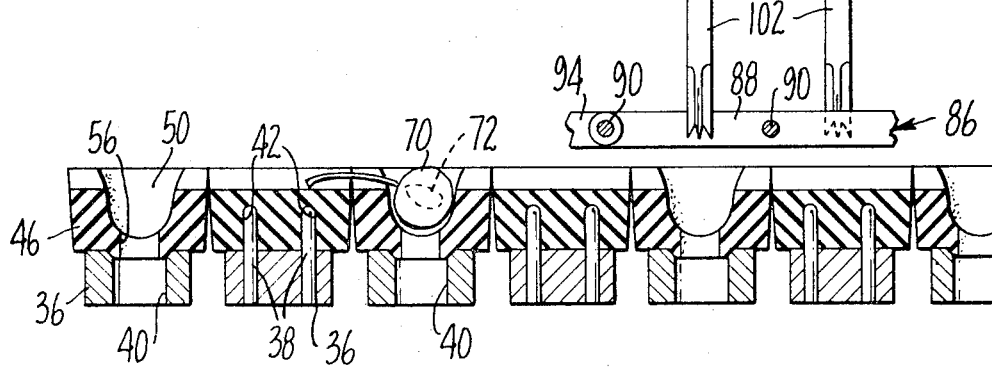
FIG. 8.
INVENTORS
JOHN L. MARGAROLI
BY FRED J. CIMPERMAN
Naylor & Neal
ATTORNEYS

CHERRY PITTER

BACKGROUND OF THE INVENTION

The present invention relates to the art of fruit handling, and more particularly, to a method and apparatus for handling and removing the pits from fruit.

Fruit handling and pitting machines are well known in the prior art. Many of the prior art approaches, however, do not readily lend themselves to use with certain fruit, such as cocktail cherries or the like, which present specific difficulties insofar as removal of the pits therefrom are concerned.

SUMMARY OF THE INVENTION

It is therefore a principal object of the present invention to provide an improved method and apparatus for the removal of pits from fruit. Certain aspects of the present invention are directed to the removal of pits from fruit, such as cherries or the like, having stems, while other aspects of the invention have application to either stemmed or unstemmed fruit.

It is another object of the present invention to provide an improved apparatus and method for effecting removal of pits from fruit, such as cherries or the like, with minimal damage to the meat of the fruit and/or minimal loss thereof during processing.

The above and other objects of this invention have been attained in accordance with the teachings of the present invention by providing an improved fruit handling and pitting apparatus and method. According to the invention, in a machine including pitting knife means for removing pits from fruit, a moveable conveyor is adapted to convey the fruit to the knife means. The conveyor comprises a plurality of elongated fruit holders, each of which includes a substantially rigid carrying plate having a plurality of pins projecting outwardly therefrom. A chuck constructed of resilient deformable material and having a plurality of fruit pockets formed therein is positioned on the plate. The chuck additionally has formed therein ejection slits formed along a predetermined axis and communicating with each of the fruit pockets at the bottom thereof. The pins are positioned in cavities formed in the bottom of the chuck on opposite sides of the fruit pocket along a line perpendicular to the axis of the ejection slit and cooperate therewith to urge the slit to a closed condition. This arrangement provides for the clean removal of a pit by the pitting knife means when the pit is forced thereby downwardly and through the slits. In addition, with the slits in a closed position, water is placed in the pockets so that fruit disposed therein floats and, under the influence of gravity, assumes a position in the pocket which will facilitate removal of the pit. Disposed above the conveyor is a stem positioning means which is adapted to engage the stems of the fruit disposed in the fruit pockets as it is being conveyed to the pitting knife means. The stem positioning means positions each fruit stem in slots formed in the conveyor and which communicate with the interiors of the fruit pockets. This arrangement not only insures that there will be no undesired removal of stems by the pitter knives but also assists in orienting the fruit in a desired manner to facilitate clean and efficient removal of the fruit pits. The conveyor includes an uphill run as it approaches the pitting knives to further assist in the proper positioning of the fruit and enable the machine to be constructed of a shorter length than would otherwise be the case.

BRIEF DESCRIPTION OF THE DRAWINGS

The above and other objects of the present invention will be understood with reference to the following description and accompanying drawings wherein:

FIG. 3 is a cross-sectional elevational view of a fruit holder of the present invention.

FIG. 4 is a cross-sectional view illustrating geometric details of a fruit specimen.

FIGS. 5 and 6 are enlarged, cross-sectional views of a broken away portion of a fruit holder and showing fruit held thereby at successive stages of the pitting process.

FIG. 7 is a fragmentary plan view illustrating selected portions of the apparatus conveyor, fruit holder and stem retaining means.

FIG. 8 is a cross-sectional view taken along the line 8—8 of FIG. 7.

DESCRIPTION OF THE ILLUSTRATED EMBODIMENT

Figure 2:
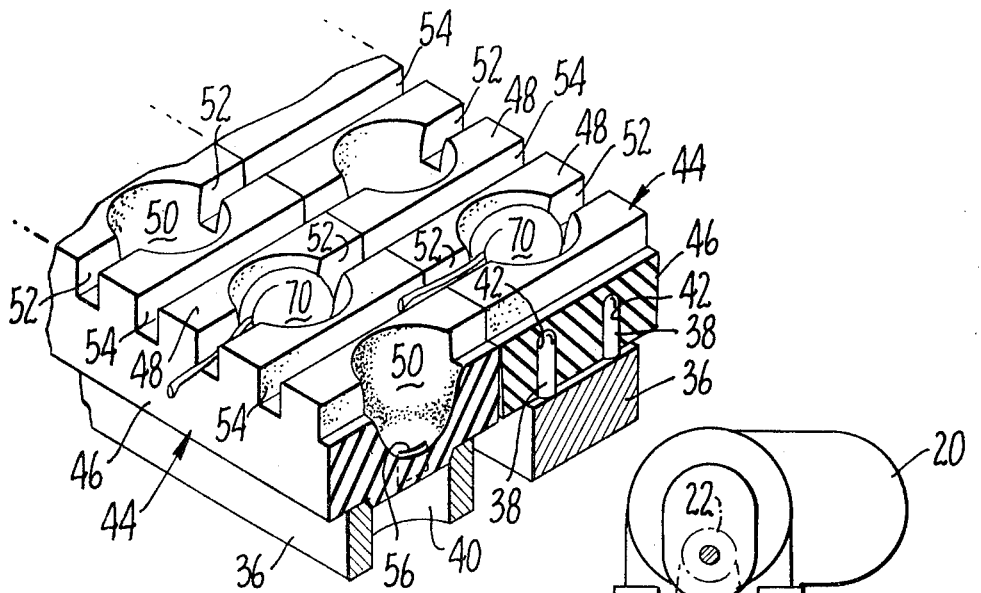
FIG. 2 is an enlarged isometric cross-sectional view illustrating details of two fruit holders incorporated on the apparatus of FIG. 1.

Referring now to the drawings, apparatus constructed in accordance with the teachings of the present invention is designated generally by means of reference numeral 10. The apparatus includes a frame work 12 having a conveyor 14 mounted thereon for movement about journals 16 and 18. Movement of the conveyor is effected by rotation of journal 18 through this latter element's interconnection with the output shaft of a motor 20. The drive train providing such interconnection includes a sheave 22 mounted on the output shaft of the motor, intermediate drive belts 24 and 25 and a pulley 26 mounted on the end of journal 18.

The conveyor comprises two endless chain loops 28 disposed in parallel planes and in engagement with sprockets 32 and 34 formed on journals 16 and 18, respectively. Extending between chain loops 28 are a plurality of plates 36 which are secured at the ends thereof to the chain loops by any suitable expedient so that the plates are disposed in spaced, substantially parallel relationship to one another. The longitudinal axes of the plates are disposed perpendicular to the path of movement of the chain loops as they are rotated.

Projecting upwardly from each plate 36 are a plurality of pins 38. As may best be seen with reference to FIGS. 2, 5 and 6, pins 38 are spaced from one another and are disposed in pairs on either side of spaced throughbores 40 formed in each plate. As may best be seen with reference to FIGS. 2, 5 and 6, the pins 38 are adapted to enter into corresponding sockets 42 formed in elongated fruit holders 44 to maintain the fruit holders in position on plates 36.

Details of a representative elongated fruit holder 44 may be seen with reference to FIGS. 2 and 3, it being understood of course that the number of such fruit holders incorporated in the conveyor corresponds to the numbers of plates 36 employed thereon. Each of the fruit holders 44 comprises a chuck of unitary construction which is formed of a suitable resilient material such as molded rubber or the like. Each chuck comprises a base 46 having a plurality of discrete block elements 48 extending upwardly therefrom in the manner illustrated. A fruit pocket 50 is formed in each of the discrete block elements 48 with the generally elliptical shaped bottoms of the pockets terminating in base 46. Each of the block elements 48 also has formed therein a pair of diametrically opposed slots 52 which communicate with the interior of each of pockets 50 as shown. In addition, the discrete block elements 48 are of generally rectangular configuration having opposed side walls defining a second series of slots 54 therebetween. When the conveyor is in the illustrated fully assembled condition, elongated fruit holders 44 are staggered with respect to one another along the conveyor so that the fruit slots 52 of each of the elongated fruit holders are in registry with the secondary slots 54 of adjacent elongated fruit holders. This may most clearly be seen with reference to FIG. 2. With further reference to that figure it should also be noted that the fruit holders 44 have a width somewhat greater than that of plates 36 so that the fruit holders 44 are in generally abutting relationship along the full length of the conveyor.

A plurality of elongated pit ejection slits 56 are formed in each chuck or fruit holder with one such slit being located at the bottom of each fruit pocket 50. Slits 56 extend entirely through the chuck base so that they provide communication between the interior of the fruit pockets and the bottom of the fruit holder. Each slit 56 extends along a predetermined longitudinal axis generally corresponding to the path of the conveyor and longitudinal axes of slots 52. The slits 56 are normally continuously urged to a closed position so that each fruit pocket is, in effect, substantially fruit-tight over the extent of the bottom thereof. This is accomplished as follows. The pairs of pins 38 disposed on either side of throughbores 40 formed in plates 36 are disposed a predetermined distance from one another. In like manner, the corresponding pairs of sockets or cavities 42 formed in the bottom of each base 46 are disposed a second predetermined distance from one another. This second predetermined distance, however, is somewhat greater than the distance between the pin pairs when the chuck or fruit holder is not in position on the conveyor and the chuck is in an unstressed condition. Therefore, to position the chucks or fruit holders 44 on their respective plates 36, and endwise compressive force must be applied thereto so that the sockets or cavities 42 are placed in alignment with the pins 38. Such endwise compressive force is maintained as to the fruit holder bases 46 when the pins are slipped into position in their respective cavities. Since each slit 56 has a longitudinal axis perpendicular to such compressive forces, the slits are continuously urged to the illustrated closed condition.

Figure 1:
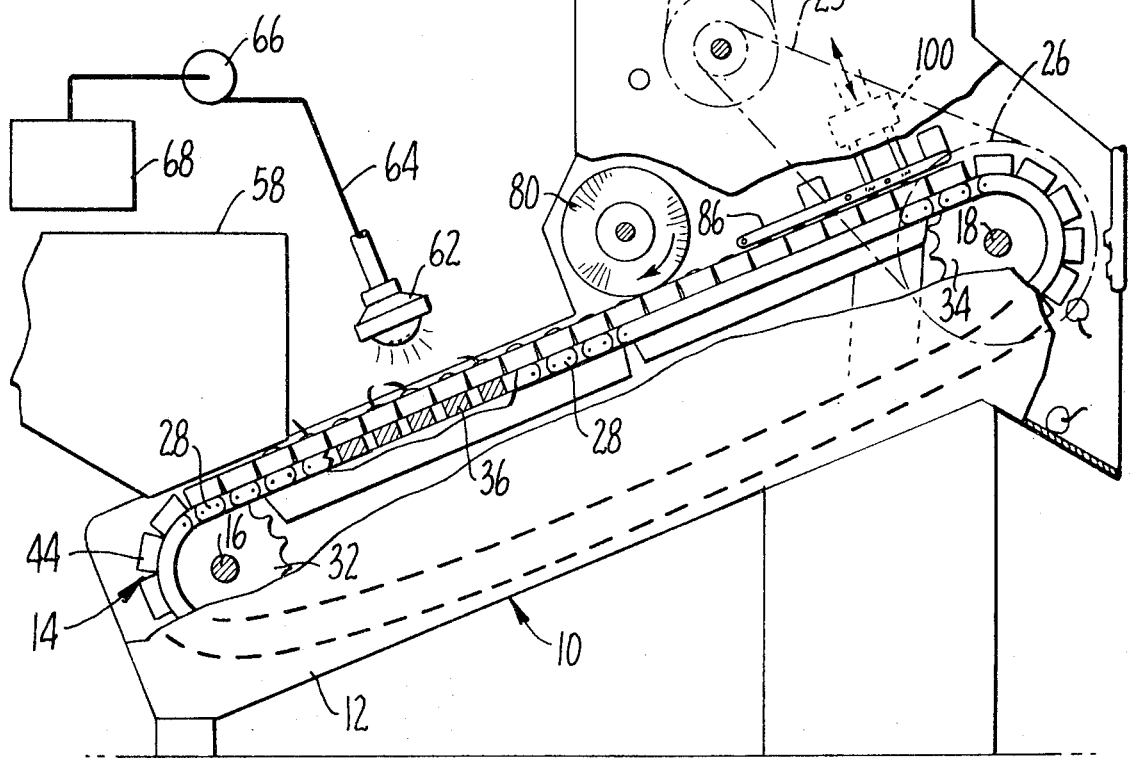
FIG. 1 is a side view of apparatus constructed in accordance with the present invention with selected portions thereof broken away or in cross section to reveal details of construction.

As viewed in FIG. 1, the conveyor 14 is adapted to move in a clockwise direction. The upper run of the conveyor is disposed so that it moves continuously uphill. As each fruit holder or chuck moves in a generally uphill direction toward the right it passes three distinct operational stages which will be described subsequently. Before doing so, however, it should be understood that each of the fruit holder pockets is adapted to accommodate therein a single fruit specimen. Apparatus for feeding fruit on an individual basis to conveyor systems is well known in the art. For this reason such apparatus will not be described other than to indicate the general position assumed by such equipment by means of reference numeral 58. Each fruit holder or chuck 44 will, in the embodiment illustrated, carry ten such fruit specimens.

As the fruit holders accommodating individual fruit specimens move along the conveyor, they serially pass under water distribution means in the form of a sprayer 62 which has a plurality of downwardly directed nozzles for the distribution of water into the fruit holder pockets 50. The sprayer 62 extends along the full width of the conveyor and is secured thereabove by any suitable structure. The sprayer 62 receives its water through communicating conduit 64 which in turn is connected to the outlet of a fluid pump 66. Pump 66 receives its water from any suitable source such as supply tank 68. The water supply system is adapted to substantially fill the pockets 50 of each fruit holder as they pass under the sprayer 62. Since pit ejection slits 56 are maintained in a substantially watertight closed condition, the water entering into the pockets 50 will, excluding overflow, remain therein.

The individual cherry specimens, which are indicated in the drawings by means of reference numeral 70, disposed in each fruit pocket are caused to float therein upon introduction of water into the pocket by sprayer 62. As the cherry specimens float out of engagement with the pocket bottoms they orient themselves in the water with the broad side of the cherry in a substantially horizontal position. This feature is important insofar as the pitting of cherries is concerned since the flotation of each specimen places the pit 72 thereof in an edgewise condition in alignment with the suture line 74 (FIG. 4) of the cherry which is oriented in a substantially vertical plane upon flotation of the cherry. It will be appreciated that a generally downwardly directed force exerted on the pit 72 of each cherry when it is in the aforedescribed position will cause minimal damage to the meat of the fruit as it is forced outwardly therefrom since the pit exits edgewise from the fruit main body along the suture line thereof.

After passing under sprayer 62 each fruit holder 44 then passes under a stem positioning means comprising a rotary brush 80 (FIG. 1) disposed above conveyor 14. Brush 80 has an axis of rotation substantially perpendicular to the direction of the path of movement of said conveyor. The brush is journalled in framework 12 and is connected to a suitable prime mover means (not shown) for the purpose of rotating the brush in a clockwise direction. The bristles of the brush therefor sweep across the fruit holders or chucks 44 in a direction opposite to the path of motion of the conveyor. As may best be seen with reference to FIGS. 1 and 7, such relative movement causes the brush bristles to engage any upwardly extending stems 76 of the fruit, sweeping said stems to the left as viewed in FIG. 1, and positioning each stem in a first slot 52 communicating with the pocket within which each fruit specimen is received and a second slot 54 of the adjacent trailing elongated fruit holder 44 which is in registry with said first slot. This places the stems out of the way of the pitting knives and assists in orienting each fruit specimen 70 within the associated fruit pocket.

Disposed uphill from rotary brush 80 and close to the top surfaces of fruit holders or chucks 44 is a stem retaining means for retaining fruit stems in their respective slots after positioning thereof by the brush. As may be seen with reference to FIGS. 1, 7 and 8, the stem retaining means is in the general form of a plate 86 comprised of a plurality of spaced elongated members 88 mounted upon rods 90 so that said elongated members define a plurality of spaced stem receiving channels 92. Spacers 94 are positioned on at least some of the rods 90 in abutting engagement with the spaced elongated members 88 to maintain these latter members the desired distance from one another. The spacers are in the form of collars having throughbores formed therein threaded on to the rods 90 between the elongated members 88.

Plate 86 is secured to framework 12 so that it lies in a plane substantially parallel to the plane of movement of the conveyor 14 along its upper run. In addition, the plate is positioned so that it is disposed closely adjacent to the conveyor fruit holders 44 with the channels 92 of the plate being disposed in registry with the fruit pockets 50 and with the longitudinal axes of said channels being oriented in a direction perpendicular to the longitudinal axes of the fruit holders 44. As the fruit stems 76 pass from under brush 80 they are aligned in registry with the various channels 92. The cross rods 90 and spacers 94 upon being engaged by the fruit stems assist in maintaining them in their associated slots.

Plate 86 is disposed under a pitter knife assembly 100. The knife assembly will not be described in detail since such equipment is well known in the art. The assembly 100 includes a plurality of pitting knives 102 which are mounted for reciprocal up-and-down motion to perform the pitting operation which will be described below. The movement of the pitting knives is coupled in the conventional manner to movement of the fruit conveyor so that the plurality of knives moves downwardly into the fruit pockets 50. In the embodiment illustrated there are twenty knives 102 incorporated with the arrangement of the present invention. Upon downward movement of all of the knives, one such knife will enter into each pocket of two adjacent fruit holders or chucks 44.

The action of one such knife during its downward movement may best be seen with reference to FIGS. 5 and 6, wherein the knife 102 is shown in two consecutive positions assumed thereby as it moves downwardly through a cherry specimen 70 to force the pit 72 thereof in a downward direction.

Continued downward movement of the pitting knife causes the pit to enter into and exit from the pit ejection slit 56. The deformable bottom defining the fruit pocket 50 and the slit allows passage of the pit and knife therethrough while at the same time imparting a wiping action to the pit additionally insuring the clean removal of the pit from the fruit meat. After ejection of the pit by the pitting knife the pitting knife assembly in the usual manner moves the pitting knife upwardly. The cherry specimen 70 is removed from the knife during such upward movement by its engagement with elongated members 88. Plate 86 therefor, in addition to operating as a stem retention means, also operates as a stripper mechanism for the cherry pitting knife. Continued movement of the conveyor moves the cherries to a location whereupon they are subsequently removed from the conveyor in the usual manner, as by gravity.

While this invention has been described with reference to a preferred embodiment thereof, it will be understood that various modifications and variations may be effected by those skilled in the art within the spirit and scope of the invention and as defined in the sub-joined claims.

What is claimed is:

1. In a machine including pitting knife means for removing pits from cherries, a conveyor including means defining a plurality of open-topped fruit pockets, each of the fruit pockets defined by said pocket defining means being adapted to have disposed therein an individual cherry, said pocket defining means including a plurality of deformable bottom portions having normally closed slits formed therein in communication with the interior of the pockets defined thereby, and means for introducing water into said pockets when the slits communicating with the interior thereof are normally closed whereby the cherries float in said pockets prior to engagement thereof by said pitting knife means.

2. The machine according to claim 1 additionally comprising means cooperating with said deformable bottom portions to continuously urge said slits to a closed position, said knife means adapted to deform said bottom portions and force the pits downwardly through the slits formed therein.

3. The machine according to claim 1 wherein said pocket defining means additionally comprises means for receiving the stems of cherries disposed in said pockets.

4. The machine according to claim 3 additionally comprising means for positioning said stems in said receiving means.

5. In a machine including pitting knife means for removing pits from fruit such as cherries or the like, a conveyor adapted to convey said fruit to said pitting knife means, said conveyor having a plurality of open-topped fruit pockets formed therein, each of said fruit pockets being adapted to have disposed therein individual specimens of said fruit, a plurality of first slots formed in said conveyor, at least one of said first slots being in communication with the interior of each of said fruit pockets, and stem positioning means disposed adjacent to the path of movement of said conveyor to engage the stems of the fruit disposed in the fruit pockets as the fruit is being conveyed to said pitting knife means to position each fruit stem in a first slot.

6. The machine according to claim 5 wherein said conveyor comprises a plurality of elongated fruit holders, each of said holders having a plurality of said fruit pockets formed in spaced relationship along the length thereof, said elongated fruit holders being disposed in substantially parallel relationship to one another with the major axes thereof positioned perpendicular to the path of movement of said conveyor.

7. The machine according to claim 6 wherein each of said fruit holders comprises a chuck of unitary construction, said chuck comprising a base and a plurality of discrete block elements extending upwardly from said base, said fruit pockets being formed in said block elements and terminating at the respective bottoms thereof in said base, said first slots being formed in said block elements and extending in a direction corresponding to the direction of the path of movement of said conveyor.

8. The machine according to claim 7 wherein said discrete block elements are of generally rectangular configuration having opposed side walls defining second slots therebetween, said elongated fruit holders being staggered with respect to one another along said conveyor so that the first slots of each of said elongated fruit holders are in registry with the second slots of adjacent elongated fruit holders.

9. The machine according to claim 8 wherein said stem positioning means comprises rotary brush means disposed above said conveyor, said brush means having an axis of rotation substantially perpendicular to the direction of the path of movement of said conveyor, said rotary brush means being adapted to engage the stem of each fruit specimen as it passes thereunder and position said stem in a first slot communicating with the pocket within which said fruit specimen is received and a second slot of an adjacent elongated fruit holder which is in registry with said first slot.

10. The machine according to claim 9 additionally comprising means for retaining the fruit stems in said slots after the positioning thereof by said stem positioning means.

11. The device according to claim 10 wherein said stem retaining means comprises a plate disposed above said conveyor in close proximity thereto and defining spaced stem retaining channels therein adapted to be placed in registry with said slots as the conveyor passes thereunder.

12. A fruit holder for use in a machine including pitting knife means for removing pits from fruit, said fruit holder comprising a substantially rigid carrying plate adapted to be affixed to a conveyor chain or the like, a plurality of pins projecting outwardly from said plate, said pins being spaced a predetermined distance from one another, a chuck constructed of resilient deformable material and having at least one fruit pocket formed therein, an elongated pit ejection slit formed in said chuck communicating with said fruit pocket at the bottom thereof, cavities for the reception of said pins formed in the bottom of said chuck on opposite sides of said fruit pocket, said cavities when said chuck is in an unstressed condition being disposed a distance apart greater than the distance between the corresponding pins whereby said chuck is compressed in the vicinity of said pocket means and said slit is continuously urged to a closed condition when said pins are inserted in said cavities.

13. In a machine including pitting knife means for removing pits from fruit such as cherries or the like, a conveyor adapted to convey said fruit to said pitting knife means, said conveyor having a plurality of open-topped generally hemispherical-shaped fruit pockets formed therein, said pockets each having a major axis, a plurality of slots formed in said conveyor, at least one of said slots being in communication with the interior of each of said fruit pockets, each of said slots being adapted to accommodate therein the stem of the fruit specimen disposed in the communicating pocket, said slots being of sufficient length and configuration so that the conveyor cooperates with said stems to orient said fruit, said conveyor having an uphill run approaching said pitter knives, said slots when along said run being disposed downhill from the communicating pocket, and said pocket major axis being angled away from the vertical at an angle substantially corresponding to the angle between the uphill run of said conveyor and the horizontal.

* * * * *